United States Patent [19]

Wallace et al.

[11] 4,346,393

[45] Aug. 24, 1982

[54] MATRIX PRINTER EMPLOYING A SPECIAL CHARACTER FONT

[75] Inventors: Harry L. Wallace, Livonia; John M. Chambors, Canton, both of Mich.

[73] Assignee: Burroughs Corporation, Detroit, Mich.

[21] Appl. No.: 145,779

[22] Filed: May 2, 1980

[51] Int. Cl.³ ............................................. G01D 15/18
[52] U.S. Cl. ................................................ 346/140 R
[58] Field of Search ................... 346/1.1, 75, 140 PD, 346/140 R

[56] References Cited

U.S. PATENT DOCUMENTS 4,059,183 11/1977 Hoskins .............................. 346/75 X
4,158,847 6/1979 Heinzl et al. .................... 346/140 R

OTHER PUBLICATIONS

*IBM Technical Disclosure Bulletin,* vol. 20, No. 2, Jul. 1977, pp. 553–554, Pelkie, R. E. and Tomek, R. E., "Ink Jet Head", 346-375.

*Primary Examiner*—Joseph W. Hartary
*Assistant Examiner*—W. J. Brady
*Attorney, Agent, or Firm*—Delbert P. Warner; Kevin R. Peterson

[57] ABSTRACT

A system for use in generating characters in accordance with a special character font formed by a selected arrangement of dots. The system enables the production of characters at a higher rate than is possible, using particular equipment for characters having a conventional form. The system makes use of ink jet printers which are controlled electronically to project jets of ink to produce dots arranged in accordance with the new font.

1 Claim, 4 Drawing Figures

VIEWED FROM FRONT

FIG. 3.

CHARACTER: E

2381 #Z  (4,5)

```
• • 1
2 • • 3
4 • • 5
6 • • 7
8 • • 9
10 • • 11
   12
```

CHARACTER PRINTED ON FACE OF DOCUMENT INK JET VIEWED FROM BACK OF HEAD.

DOCUMENT MOTION →

| TIME (μS) | DISTANCE INCHES | ANGLE TURN FOR 2.75 DIA. DRUM | 1 | 2 | 3 | 4 | 5 | 6 | 7 | 8 | 9 | 10 | 11 | 12 | |
|---|---|---|---|---|---|---|---|---|---|---|---|---|---|---|---|
| $t_0$ 0 | 0 | 0° | | 2 | | | | | | | | | | 12 | 1 |
| $t_1$ 105 | .0105 | 0.44° | | | | | | | | | | | | | |
| $t_2$ 210 | .0210 | 0.88° | | | | | | | | | | | 11 | 12 | 2 |
| $t_3$ 315 | .0315 | 1.31° | | | | | | | | | | | | | |
| $t_4$ 420 | .0420 | 1.75° | 1 | 2 | | | | 6 | 7 | | | | | | 4 |
| $t_5$ 525 | .0525 | 2.19° | | | | | | | | | | | | | |
| $t_6$ 630 | .0630 | 2.63° | | | | | | | | | | | 11 | 12 | 2 |
| $t_7$ 735 | .0735 | 3.06° | | | | | | | | | | | | | |
| $t_8$ 840 | .0840 | 3.50° | 1 | 2 | | 4 | | 6 | 7 | 8 | | 10 | | | 7 |
| $t_9$ 945 | .0945 | 3.94° | | | | | | | | | | | | | |
| $t_{10}$ 1050 | .1050 | 4.38° | | | | | | | | | | | 11 | | 1 |
| $t_{11}$ 1155 | .1155 | 4.81° | SPACE COLUMN, NO INK DOTS PRINTED. | | | | | | | | | | | | 17 |

INK JET NUMBER

MATRIX PRINTER EMPLOYING A SPECIAL CHARACTER FONT

CROSS REFERENCE TO RELATED APPLICATION

Copending U.S. patent application Ser. No. 145,870 entitled "System For Matrix Printing" filed May 2, 1980 in the name of John M. Chambors and Harry L. Wallace and assigned to the same assignee as the present invention is hereby incorporated by reference.

BACKGROUND OF THE INVENTION

1. Field of the Invention

The present invention relates to matrix printers and particularly to ink jet printers. It particularly relates to improvements in the generation of patterns of dots forming characters in accordance with a novel character font and to the generation of such characters more rapidly with particular printers than formerly has been possible.

2. Description of the Prior Art

Prior art matrix printers have been designed to operate within certain speed ranges. They cannot generally print effectively, or at all, at speeds which exceed those ranges. These upper limits on operating speeds impose undesirable limits in circumstances in which higher speeds are required, but where limits of space or other considerations militate against the use of other equipment which can operate at faster rates. This is especially the case in those circumstances where the use of such other equipment would require drastic changes in the configuration of a printing system.

The control systems employed with the prior art devices have generally been designed to operate the printers within the designed speed limits. Little or no attention has been directed to the possibility of providing a new character font which, together with new control systems operating in a novel way, enable the production of characters at faster rates without driving the printing equipment beyond its capacity.

Among the prior art ink jet printers are drop-on-demand printers which can produce printed characters at relatively high speeds. However, with prior art printers of a desired configuration, it has not been possible to print, i.e. produce dots, at speeds above a certain level. In particular, with the prior art it has not been found feasible to meet the needs of check endorsing operations requiring operation at higher speeds while staying within certain parameters respecting size and shape.

SUMMARY OF THE INVENTION

The present invention relates to a system by means of which an ink jet printer or other matrix printer may be enabled to produce complete characters at a far higher rate of speed than formerly, and to do so without modification of the printer head.

This capability is provided for a printer head by controlling the head in a manner causing it to produce printed dots in accordance with a novel character font. The font makes use of novel arrangements of dots to represent each character of a code such as the characters of the ASCII. Control of the ink jet heads is provided from electronic microprocessors controlling an electronic character generator. A preferred embodiment of the invention involves the use of a drop-on-demand ink jet printer head, but it will be recognized that the invention has application to other matrix type printers.

The invention relates further to a system for generating printed characters by injecting drops of ink to form patterns on a document moving past a head supporting a group of ink jet nozzles. The system receives signals from a processor indicating which characters are to be printed, when they are to be printed and where they are to be printed. The system routes these signals through its internal microcontroller to locate the designated characters in its memory and routes signals identifying each of the dots making up those characters for storage in registers. On receipt of fire pulses from an internal microcontroller, the jet nozzles are caused to fire and produce the desired characters by printing dots in appropriate locations on the moving document.

The invention relates further to a system for controlling the generation of printed characters by ink jet nozzles in which an array of ink jet nozzles is employed to eject drops of ink selectively to form patterns on objects moving past the nozzles. Signals from outside the system are employed to determine what patterns are to be printed, when they are to be printed and where they are to be printed. A microcontroller is coupled responsive to signals from outside the system to provide control signals and intermediate means including memory means are coupled to respond to selected control signals for generating dot designating signals. The dot designating signals are employed in the generation of ink dots for use in the production of printed patterns after first being stored in registers. The registers are coupled through an ink jet driver to ink jet nozzles. Control signals from the microcontroller include fire control signals provided to control the registers and provide drive signals to the ink jet driver where the logic control of the drive signals is determined by the dot designating signals. The ink jet driver responds to the drive signals from the register in a manner such that the ink jet nozzles are driven, as determined by said dot designating signals, to provide a progression of printed dots in which dots in successive print positions are produced by different jet nozzles.

The system relates also to the formation of printed characters by the selective application of ink jet nozzles of an ink jet head. This involves energizing an ink jet head as a moving sheet of paper reaches a first position adjacent to the head to form a first part of a character by projecting ink onto the paper from an ink source including at least one ink jet nozzle. It involves then energizing said ink jet head as a moving sheet of paper reaches each successive position to form additional parts of a character by projecting ink from an ink source including ink jet nozzles different from the nozzles employed at the last preceding position of the sheet of paper, whereby, parts of a character are formed in such a way that dots in adjacent point positions are formed by different ink jet nozzles.

BRIEF DESCRIPTION OF THE DRAWINGS

FIG. 3 is a chart illustrating the order of firing ink jet nozzles arranged according to FIG. 2 to provide a representation of the letter E in accordance with the invention.

DESCRIPTION OF A PREFERRED EMBODIMENT

Figure 1:
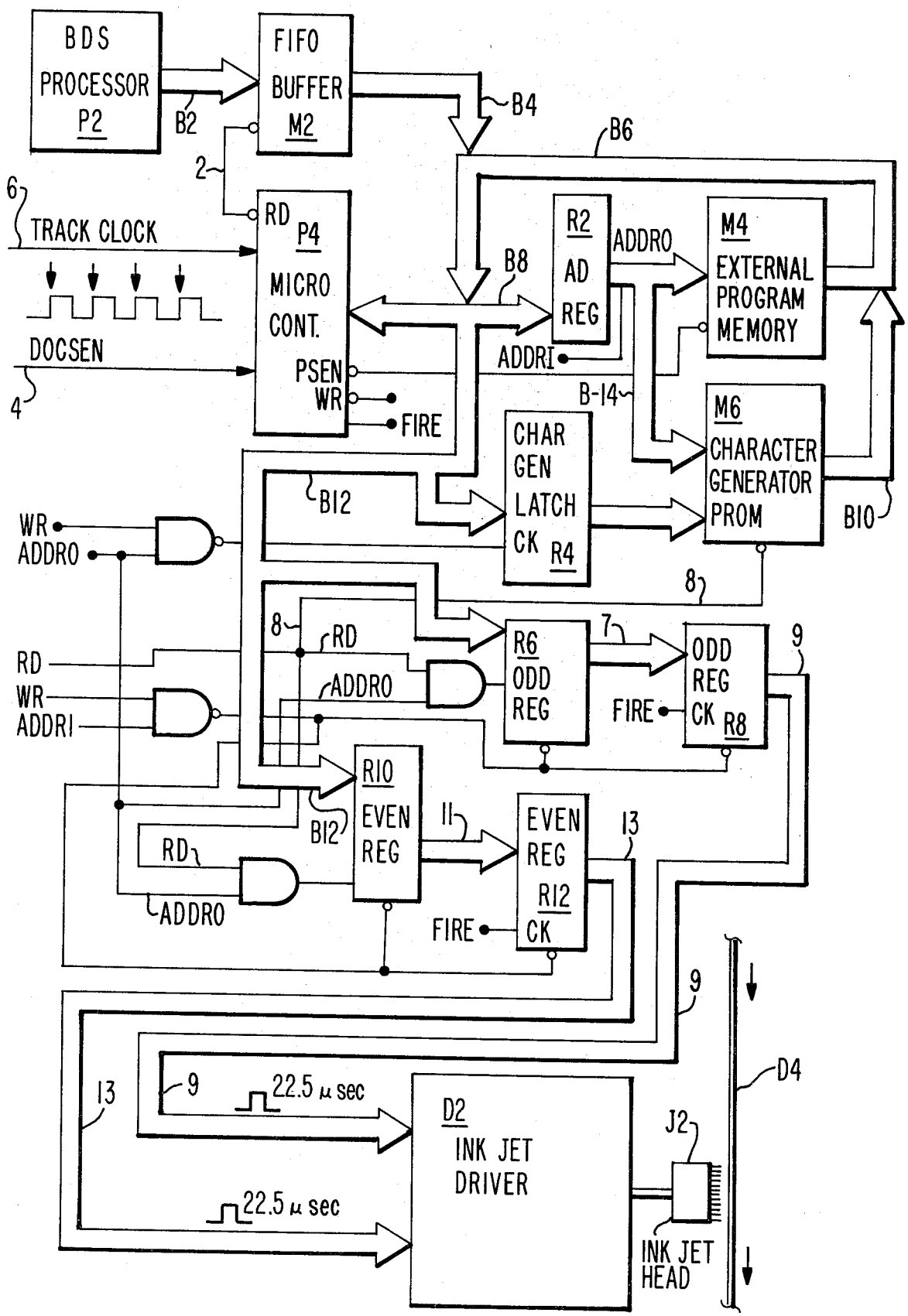
FIG. 1 is a block diagram showing an arrangement of a control system for an ink jet printer in accordance with the invention.

Turning now to FIG. 1, a BDS or Burroughs Data Systems processor P2 is shown as a primary source of information fed to the present invention. This processor designates what is to be printed and where it is to be printed on each document being processed. This information, which may include a line of words to be printed, is transmitted in the form of input signals over a bus B2 to a thirty-two word FIFO buffer, or first-in first-out memory, M2 which interfaces the BDS processor with the microcontroller P4 and with other elements of the system to be controlled. In a preferred embodiment, the FIFO buffer is an AM 2813 A from Advance Micro Devices or other sources and the microcontroller (P4) used is a single component 8-bit Microcomputer, such as an 8035, manufactured by Intel and available from other manufacturers as well.

Other inputs to the system are provided over lines 4 and 6. These inputs are essentially timing signals to indicate when certain conditions have occurred and are used in the control of the microcontroller. The signals over line 4 are from a sensor (not shown) which advises when the presence of a document has been sensed in preparation for printing on the document. The signals over line 6 are clock signals from a sensor (not shown) operated in cooperation with a timing disc driver in synchronization with a drive wheel of the printer. The signals over line 6 enable the microcontroller to determine the speed at which a document is moving and, in conjunction with the document sensing signal over line 4 and the input signals originating from P2, to determine precisely when the ink jets are to be operated to print symbols in proper places on the documents.

The FIFO buffer M2 may be controlled over the read line 2 from the microcontroller P4. When a read signal is received at the buffer over line 2 from P4, information specifying the characters to be printed and the location of printing is transferred from the buffer M2 over the bus B4, the bus B6 and the bus B8 into the internal memory of the microcontroller P4. When a document arrives at a position where it is to be printed, as determined from data supplied over lines 4 and 6, the microcontroller P4 transmits required information over the buses B6, B8 and B12 for printing, as will be explained in detail in the following.

Synchronization between the signals commanding the system to print and the position of the document to be printed is established, as was briefly alluded to before, by timing devices including document sensing means and a sensor coupled to a timing disc. Document sensing means (not shown) determine when a document such as D4, is present at a particular location. A timing disc and sensor located, respectively, on and adjacent to one of the drive wheels (not shown) that drives the document through the endorser provides track clock signals over line 6 to the controller P4 and the document present sensor (DOCSEN) provides signals over line 4 to the controller P4. The signals over lines 4 and 6 enable the controller to determine when the nozzles of the print head J2 should be fired to enable the desired information to be printed in the right places, which may be referred to as print positions, on the moving document at P4.

A system incorporated in the microcontroller determines the speed with which the document is moving based on signals over 4 and 6 and tells the equipment how fast to fire the ink jets so that ink lands properly in the print positions. If the document moves faster, the ink jets must, of course, be fired faster; and, if the document moves slower, the ink jets must be fired at a slower speed. In other words, the frequency with which ink jet dot patterns are fired is dependent upon the speed with which the documents move and must be correct and within system capabilities in order to assure proper placement of the dot patterns.

An address register R2, which may preferably consist of a plurality of Flip Flops, configured as in a 74SL273, is coupled via the bus B8 to the microcontroller P4. This address register is used by the microcontroller to address an external program memory chip, M4, which may consist of an ultra violet Erasable Prom, such as a 2758. The E-Prom M4 serves as an external memory which is pre-loaded with instructions for use of the microcontroller P4. When a particular inquiry is received by M4 from P4, M4 can put the required instructions for P4 directly on the data bus B6 where they can be read by P4.

Figure 2:
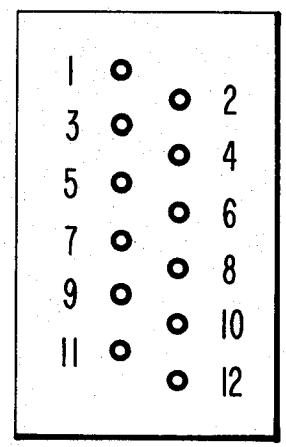
FIG. 2 is a diagram showing an arrangement of ink jet nozzles, when viewed from the front of the nozzle head, for convenience in describing the operation of the invention.

The ink jet head employed with embodiments of the present invention has twelve nozzles divided into two groups of six which are oriented along generally parallel vertical lines and numbered to form an even side and an odd side. The configuration of the nozzles looking at the face of the head is shown in FIG. 2. To print characters with apparatus according to the present invention, specific nozzles are fired at proper times for each of them to produce dots in desired locations on moving documents.

The desired characters, dilineating the proper position for each dot, are stored in a character generator M6, which may be a 2758 E-Prom corresponding to the E-Prom M4. In order to access these characters, the outputs of the character generator are placed, via data bus B10, on the data bus B6. The information from M6 is stored by the microcontroller P4 internally, and in control registers R6, R8, R10 and R12 which in turn transmit the information to control the ink jet driver board D2 and the related nozzles in the ink jet head J2. In a preferred example, the registers R6, R8, R10 and R12 were formed from Hex/Quadruple D-Type Flip-Flops configured as in the 74LS174.

The two registers R6 and R10 store signals for the odd and even patterns preparatory to the nozzles actually being fired. Registers R8 for the odd and R12 for the even nozzles are employed to generate properly timed pulses that go to the ink jet driver board itself which then operates the nozzles. The registers R8 and R12 provide pulses of 22.5 microsecond duration responsive to fire signals from P4 to fire the respective nozzles in the head for a controlled period of time. The pulse timing and duration is established by the controller P4 in response to a plurality of signals including clock pulses over line 6 from a timing disc, a document present signal over line 4 and data from the buffer M2.

Given information from the microcontroller P4 that a particular character is to be printed, it is necessary to turn to the character generator Prom M6 to determine where the character to be printed is stored in that prom and then retrieve information respecting the format of the character from the character generator prom. This information is then directly applied over the data bus via segments B10, B6, and B8 to the microcontroller and via segments B10, B6, and B12 to the correct odd and even registers R6 and R10 for storage and subsequent application to the nozzle controls at D2.

In order to place the character dots in the right places, it is necessary to form the correct address for each group of dots. This is done by composing an address from two sources which feed into the character generator M6. The first source is a character latch R4, consisting of a 74LS273 or equivalent, which is tied to the data bus and identifies one of 64 possible characters in the character generator. The other source is the address register R2, the output of which the microcontroller P4 uses to make its selection of output signals for the character selected by R4.

OPERATION OF THE PREFERRED EMBODIMENT

The principle inputs pertinent to the controller system of FIG. 1 are received over three lines including: the lines B2 from the BDS processor telling what to print; the line 4 from document sensing apparatus advising that a document is present in a position to receive print; and the line 6 over which a clock signal from a sensor on a timing disc tells precisely when to print. It will be noted that the BDS processor provides the information about what to print and stores the information in the FIFO buffer M2 before the document arrives. When the document arrives in a position in front of the print head where printing is to be done, printing is carried out using information read from the FIFO buffer.

A general overview of the steps involved in printing a character, according to the invention, may be simply stated. Assume the process originates when the microcontroller (P4) "learns" (from the BDS processor) it is desirable to print a symbol, say from the ASCII code, such as an "A". It looks into its internal memory for information to determine the location or address of the "A" in the character generator M6. It then transmits information identifying that address to the character generator latch R4 where the information is stored temporarily. The remainder of the address for the character generator prom M6 is formed by taking some bits from the address register R2 and transmitting them over the segment B14 of the data bus to the character generator M6. The character generator is preferably a one kilobit by eight bit prom which employs ten bits of addressing, part of which, as indicated above, comes from the character latch R4 and part from the address register R2. This information is then directly applied over the data bus via segments B10, B6 and B8 to the microcontroller and via segments B10, B6 and B12 to the correct odd and even registers R6 and R10 for storage and subsequent application to the nozzle controls at D2.

Figure 4:
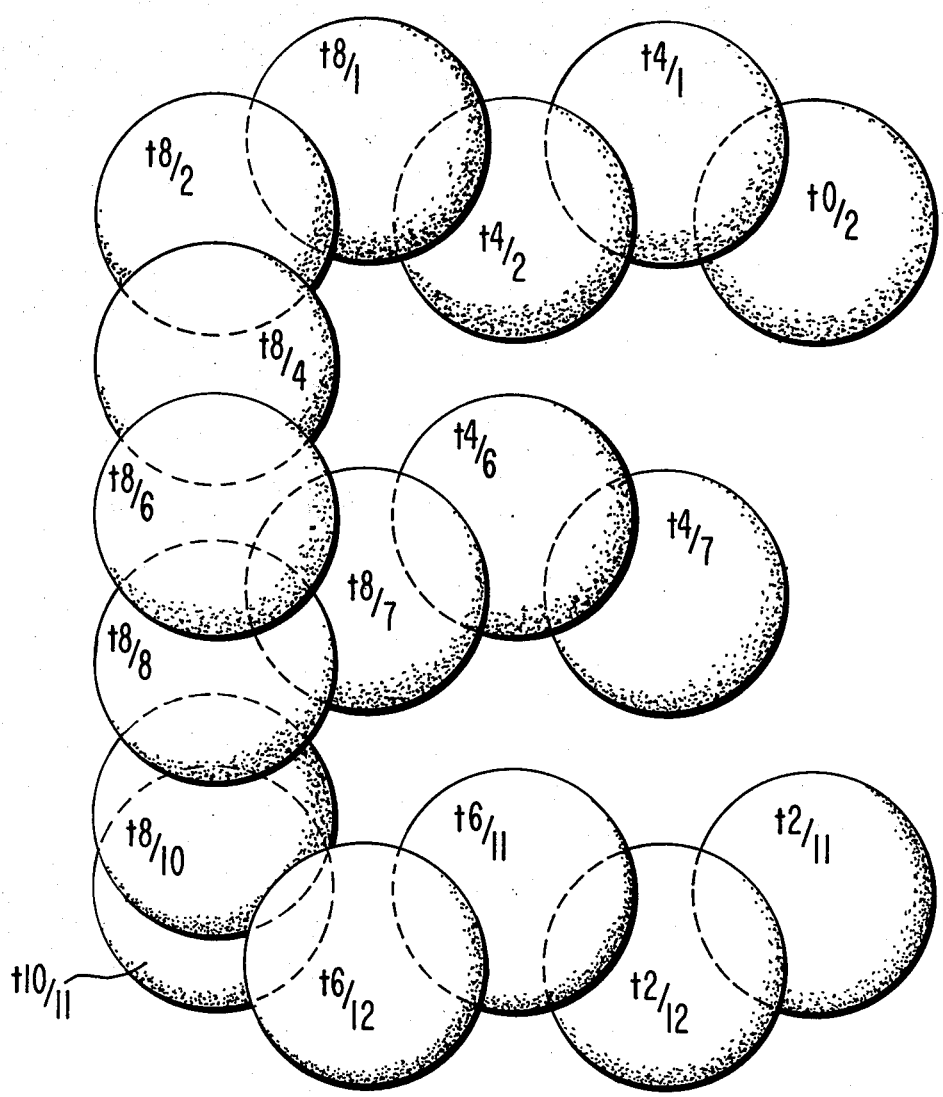
FIG. 4 is a chart illustrating the format of an E constructed by use of the firing sequence shown in the chart in FIG. 3.

FIG. 2 is a diagram illustrating the arrangement of jet nozzles 1-12 as they appear when viewed from the front of the nozzle head. FIG. 3 is a chart illustrating the sequence in which the jet nozzles 1-12 will be fired against a moving object to produce the exemplary letter E. FIG. 4 is a representation of the letter E produced by drops of ink from the jets. In FIG. 4, the first symbols, e.g. T8 & T4 on the circles representing dried ink drops indicate the time at which a jet operated and the second symbols, e.g. 2 & 1 identify the number of a jet nozzle which operated at that time.

As previously indicated, the present invention was conceived because of the need for a printer which can operate at a relatively high speed without taking up a great deal of space. In terms of numbers, the printer must be able to print 800 characters per second on documents that move 100 inches per second. If standard characters are to be generated, about 7,000 dots would need to be generated per second. A drop-on-demand ink jet printer of a configuration otherwise desirable for the present invention could print not over 4,000 dots per second and preferably should be operated at a still lower rate.

In order to make use of the data per second capacity of the existing machine, a new character font was devised which is pleasing to the eye while only using a minimum number of dots to define the shape of each character. This font employs a 12×5 matrix with a staggered horizontal dot position used to form any straight line. With this configuration, no ink jet is required to fire any more often than every other position and it becomes possible by use of the illustrated embodiment of the invention to generate characters at the rate of 2,381 dots per second on the face of a document moving at the rate of 100 inches per second.

To produce a selection of letters according to the desired font, the letters are drawn on a 20 to 1 scale substantially as indicated for E in FIG. 4 where the circles shown represent dots produced by ink jet nozzles and the verticle lines through the dots define the print positions of the dots. As will be seen in the example of FIG. 4, the dots are arranged so that a staggard horizontal dot position is used to form any straight line. As a consequence, the requirement is met that dots in successive print positions, as indicated along the top line of FIG. 4, must be produced by different jet nozzles operating alternately, such as nozzles producing dots 2 and 1. After the format of each letter is established, it can be reproduced at the normal scale.

What is claimed is:

1. Apparatus for generating printed characters according to a novel character font where the characters are formed by dots printed in print positions on the face of a moving document by printing means forming part of the head of a matrix printer, comprising:

a drop-on-demand ink jet printer head supporting printing means including a plurality of distinct ink jet elements for projecting drops of ink to print dots on selected surfaces;

said printing means comprising a plurality of said ink jet elements spaced apart in an odd and an even column;

said ink jet printer head supporting said odd and even columns of ink jet elements in a manner such that the odd and even columns are parallel to each other;

said columns being oriented in a direction to be substantially perpendicular to horizontal rows, along which ink dots are placed;

the ink jets in the columns being offset from each other vertically so that each jet produces dots along a separate horizontal line;

register means coupled to said printer head to provide command pluses to drive said ink jet elements, causing each driven ink jet element to project a drop of ink and provide a dot on the selected surface;

said register means applying said command pulses to energize said ink jet elements in a sequence to assure that dots in successive adjacent print positions are placed on the surface by different ones of said ink jet elements and to assure that each ink jet element can be fired only on the occurrence of an alternate command pulse, whereby successive dots generated by any two ink jet elements will appear on different horizontal lines and successive dots generated by any one ink jet element will appear along a horizontal line with a blank space between dots.

* * * * *